(12) United States Patent
Yun et al.

(10) Patent No.: US 7,619,703 B2
(45) Date of Patent: Nov. 17, 2009

(54) LIQUID CRYSTAL DISPLAY

(75) Inventors: Young-Nam Yun, Gyeonggi-do (KR); Maung-Hi Lee, Gyeonggi-do (KR); Sang-Hoon Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 286 days.

(21) Appl. No.: 11/298,851

(22) Filed: Dec. 9, 2005

(65) Prior Publication Data
US 2006/0164574 A1 Jul. 27, 2006

(30) Foreign Application Priority Data
Jan. 26, 2005 (KR) .................. 10-2005-0007123

(51) Int. Cl.
*G02F 1/1335* (2006.01)
(52) U.S. Cl. .................. 349/113; 349/74; 349/114; 349/96
(58) Field of Classification Search .................. 349/64, 349/74–83, 96, 113, 114, 65, 67
See application file for complete search history.

(56) References Cited

U.S. PATENT DOCUMENTS

| | | | | |
|---|---|---|---|---|
| 5,742,367 A * | 4/1998 | Kozaki | .................. | 349/64 |
| 6,262,842 B1 * | 7/2001 | Ouderkirk et al. | ........... | 359/487 |
| 6,741,301 B2 * | 5/2004 | Tsuji | .................. | 349/58 |
| 7,193,666 B2 * | 3/2007 | Choi et al. | .................. | 349/74 |
| 7,196,751 B2 * | 3/2007 | Suzuki | .................. | 349/74 |
| 7,301,591 B2 * | 11/2007 | Akiyama | .................. | 349/96 |
| 2004/0017529 A1 * | 1/2004 | Choi et al. | .................. | 349/114 |
| 2004/0264211 A1 * | 12/2004 | Han et al. | .................. | 362/561 |
| 2005/0073627 A1 * | 4/2005 | Akiyama | .................. | 349/65 |
| 2005/0128390 A1 * | 6/2005 | Yang | .................. | 349/114 |
| 2006/0007370 A1 * | 1/2006 | Suzuki | .................. | 349/74 |
| 2006/0114385 A1 * | 6/2006 | Ito et al. | .................. | 349/119 |
| 2006/0232724 A1 * | 10/2006 | Hsieh | .................. | 349/64 |
| 2007/0126956 A1 * | 6/2007 | Wu et al. | .................. | 349/114 |

FOREIGN PATENT DOCUMENTS

| | | |
|---|---|---|
| JP | 2003-207801 | 7/2003 |
| JP | 2004-087409 | 3/2004 |
| KR | 10-2003-0051122 | 6/2003 |
| KR | 10-2003-0061309 | 7/2003 |
| KR | 10-2003-0064289 | 7/2003 |
| KR | 10-2003-0068323 | 8/2003 |
| KR | 10-2004-0036558 | 4/2004 |
| KR | 10-0432009 | 5/2004 |
| KR | 10-2004-0067636 | 7/2004 |

* cited by examiner

*Primary Examiner*—David Nelms
*Assistant Examiner*—Thanh-Nhan P Nguyen
(74) *Attorney, Agent, or Firm*—Innovation Counsel LLP (57) ABSTRACT

A liquid crystal display includes a backlight unit including a light source, a first panel unit disposed on a first side of the backlight unit, a second panel unit disposed on a second side of the backlight unit, and a porous reflector disposed between the backlight unit and the second panel unit and reflecting some light that is from the light source or is externally incident, and transmitting some.

23 Claims, 11 Drawing Sheets

LIQUID CRYSTAL DISPLAY

BACKGROUND OF THE INVENTION (a) Field of the Invention

The present invention relates to a liquid crystal display (b) Description of Related Art A typical liquid crystal display ("LCD") includes two panels and, between them, a liquid crystal layer with dielectric anisotropic characteristics. The LCD displays a desired image by adjusting the strength of the electric field applied to the liquid crystal layer to control the transmittance of light passing through the panels. The LCD is representative of flat panel displays ("FPDs"). LCDs using thin film transistors ("TFTs") as switching elements are widely used.

The LCD is classified according to its light source, such as: a transmissive LCD which displays images using a backlight unit disposed at the back of the LC panel unit; a reflective LCD which displays images using ambient light; and a transflective LCD in which the transmissive and the reflective LCD characteristics are combined. The transflective LCD displays images under a transmissive mode, using an embedded light source where there is no ambient light (e.g., indoors), and under a reflective mode, by reflecting the ambient light when high illumination is available (e.g., outdoors).

Additionally, a so-called dual LCD, which is provided with two panel units (i.e., a main panel unit and a subsidiary panel unit), has been vigorously developed.

The main panel unit is provided on the inner side and the subsidiary panel unit is provided on the outer side; separate backlight units provide light for each panel unit.

Recently, a scheme in which a single backlight unit provides light for both panel units has been developed. The light from a single backlight unit is divided into two with a beam splitter for the panel units. This LCD has the advantages of being light weight and having a slim display, due to having only one backlight unit. However, dividing the light into two using the beam splitter reduces the amount of the light provided to each panel unit, thereby reducing the luminance of each panel unit.

SUMMARY OF THE INVENTION

A liquid crystal display is provided, which includes a backlight unit including a light source, a first panel unit disposed on a first side of the backlight unit, a second panel unit disposed on a second side of the backlight unit, and a porous reflector disposed between the backlight unit and the second panel unit. The porous reflector reflects light from the light source or which is externally incident, while allowing some light to be transmitted.

The porous reflector may have such a low density of the reflective material that it reflects some light and transmits some light.

The porous reflector may be formed by patterning a photoresist provided on a reflective plate.

The liquid crystal display may further include a first lower polarizer disposed between the first panel unit and the backlight unit and under the first panel unit, a first upper polarizer disposed opposite to the first lower polarizer, and a diffusion member disposed on one side of the first lower polarizer.

The liquid crystal display may further include an optical sheet disposed between the first lower polarizer and the backlight unit.

The first lower polarizer may include a first polarizing film facing the backlight unit and reflecting some light and transmitting some light, and a second polarizing film polarizing the transmitted light.

The first polarizing film and the second polarizing film may be made as a single film.

The diffusion member may include an adhesive containing a scattering material.

The first upper polarizer may include a third polarizing film having a surface processed with a low reflective material.

The liquid crystal display may further include a first lower polarizer disposed between the first panel unit and the backlight unit and under the first panel unit, and a first upper polarizer disposed opposite to the first lower polarizer, wherein the first lower polarizer comprises a diffusion member including an adhesive containing a scattering material.

The liquid crystal display may further include a first lower polarizer disposed between the first panel unit and the backlight unit and under the first panel unit, and a first upper polarizer disposed opposite to the first lower polarizer, wherein a low reflective layer is formed on a surface of the first lower polarizer facing the backlight unit.

The first panel may include thin film transistors and transparent electrodes connected to the thin film transistors, a first panel including storage electrodes for maintaining charged voltages in the transparent electrodes for a certain time, and a second panel facing the first panel and including black matrices, color filters between the black matrices, and a common electrode. The storage electrode is made of a reflective material, and no color filter is provided on the storage electrode.

A ratio of transmittance to reflectance of the porous reflector may range from 7:3 to 6:4.

A liquid crystal display is provided, which includes a backlight unit having a light source, a first panel unit disposed on a first side of the backlight unit, a second panel unit disposed on a second side of the backlight unit, and a reflective sheet disposed between the backlight unit and the second panel unit reflecting some light from the light source or from externally incident light, and transmitting some of the light.

The transflective sheet may be a thin transflective film that is so thin that it both reflects and transmits the light.

A ratio of transmittance to reflectance of the thin transflective film may range from 7:3 to 6:4.

A liquid crystal display according to an embodiment of the present invention includes a backlight unit including a light source; a first panel unit including an upper panel, a lower panel facing the upper panel, and a first upper polarizer disposed on the upper panel; a first lower polarizer disposed under the lower panel; a diffusion member disposed on one side of the first lower polarizer; a liquid crystal layer interposed between the first and second panels, retarding light passing therethrough by $\lambda/2$, having a twisted nematic mode, and forming an angle of 90 degrees between the liquid crystal adjacent to the upper panel and the liquid crystal adjacent to the lower panel; a second panel unit disposed under the first panel unit; and a porous reflector disposed between the backlight unit and the second panel unit and reflecting some light from the light source or from externally incident light, and transmitting some light.

The second panel unit may include an upper panel, a lower panel facing the upper panel, a first upper polarizer disposed on the upper panel, a first lower polarizer disposed under the lower panel, a diffusion member disposed on one side of the first lower polarizer, and a liquid crystal layer interposed between the first and second panels that retards light passing therethrough by $\lambda/2$, and having a twisted nematic mode and forming an angle of 90 degrees between the liquid crystal adjacent to the upper panel and the liquid crystal adjacent to the lower panel.

The porous reflector may have such a small density of reflective material such that it reflects some light and transmits some light.

The porous reflector may be formed by patterning a photoresist provided on a reflective plate.

The first lower polarizer may include a first polarizing film facing the backlight unit and reflecting some light and transmitting some light, and a second polarizing film polarizing the transmitted light.

The diffusion member may include an adhesive containing a scattering material.

BRIEF DESCRIPTION OF THE DRAWINGS

The present invention will become more apparent by consideration of the preferred embodiments described in detail herein, with reference to the accompanying drawings.

DETAILED DESCRIPTION OF EMBODIMENTS

The present invention is described more fully hereinafter with reference to the accompanying drawings, in which preferred embodiments of the invention are shown. This invention may, however, be embodied in many different forms and should not be construed as limited by the embodiments set forth herein.

In the drawings, the thickness of layers and regions are exaggerated for clarity. Like numerals refer to like elements throughout. It is understood that when an element such as a layer, a film, region, a substrate, or a panel is referred to as being "on" another element, such an element can be directly on the other element or intervening elements between the referenced elements may also be present. In contrast, when an element is referred to as being "directly on" another element, there are no intervening elements present.

Figure 1:
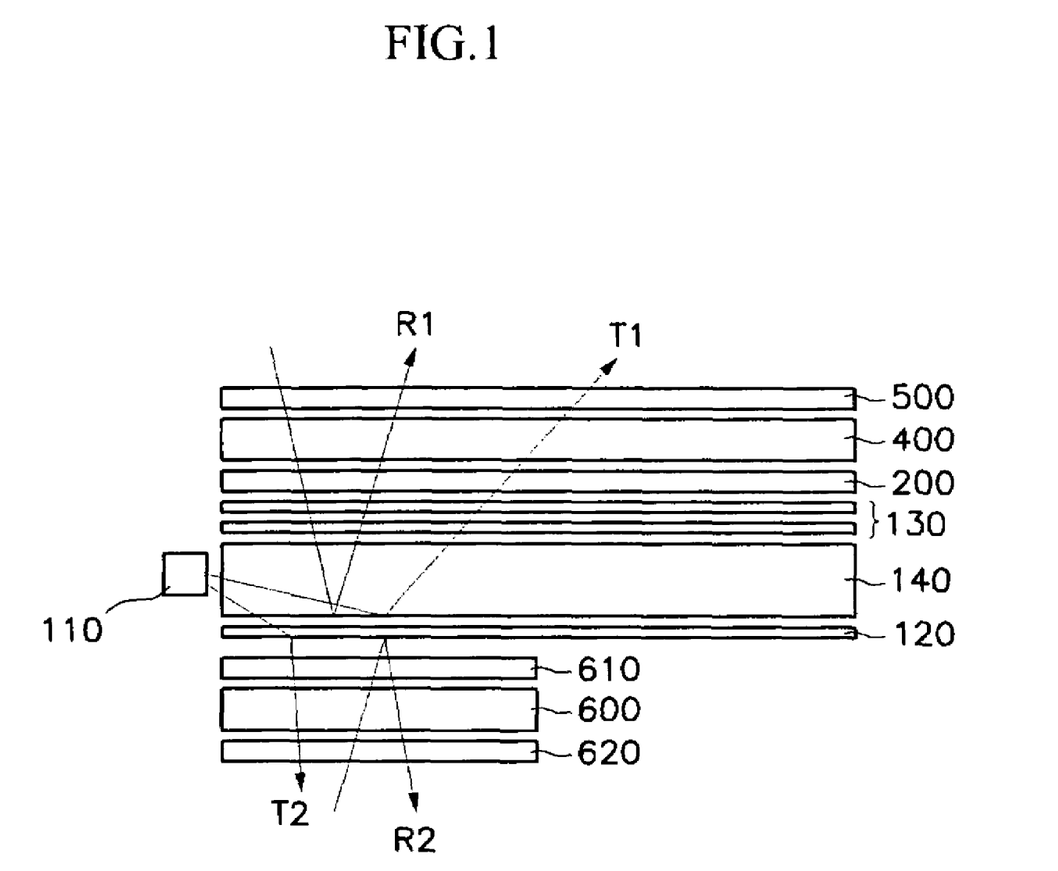
FIG. 1 is a sectional view of an LCD according to an exemplary embodiment of the present invention.
Figure 2:
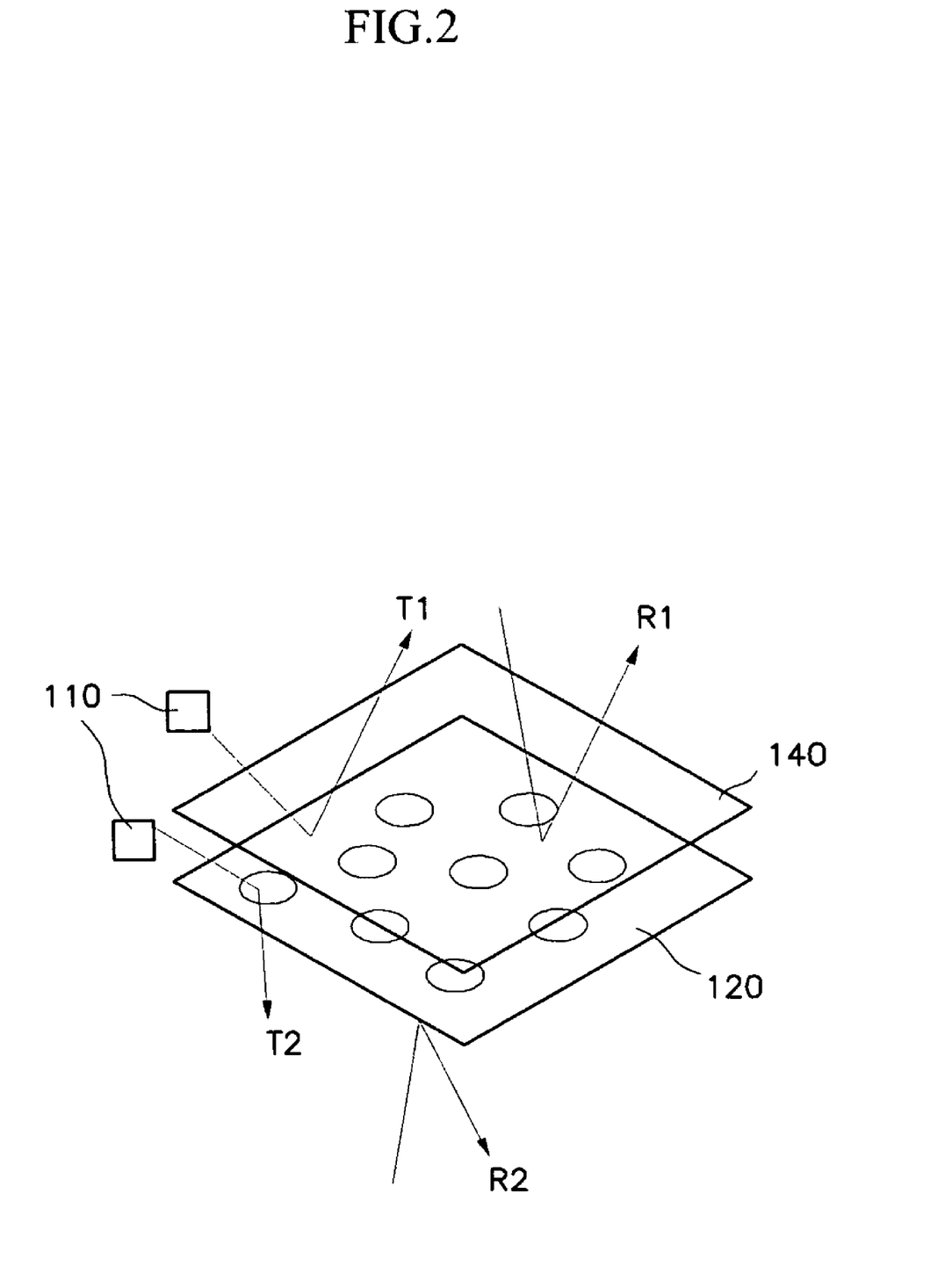
FIG. 2 is an exploded perspective view of a porous reflector and a light guide plate according to an embodiment of the present invention.

FIG. 1 is a sectional view of an LCD according to an exemplary embodiment of the present invention, and FIG. 2 is an exploded perspective view of a porous reflector and a light guide plate according to an embodiment of the present invention.

Referring to FIG. 1, a first panel unit 400 and a second panel unit 600 are respectively disposed above and below a light source 110 and a light guide plate 140.

Light from the light source 110 is reflected from a porous reflector 120 attached under the light guide plate 140 to enter the first panel unit 400 (as illustrated by T1). Light also transmits through the porous reflector 120 to enter the second panel unit 600 (as illustrated by T2).

The LCD uses ambient light, i.e., external light, as well as the light from the light source 110. That is, the external light is reflected by the porous reflector 120, which is an incident surface, to reenter the first and the second panel units 400 and 600 to display images (denoted by R1 and R2). In this way, a reflective scheme strengthens luminance, which is reduced due to division of the light from the light source 110, and causes images to be displayed using the external light as well. In addition, some of the external light is not reflected but is transmitted to enter an opposite panel unit for an increase of luminance.

The light source 110 is an element providing light for two panel units 400 and 600. The number of light sources depends on a size of the display device. The light source may be disposed at the bottom or at the edge, and is preferably disposed at the edge in the present embodiments.

The light source 110 has a portion which emits light towards the light guide plate 140, which is preferably disposed close to the light source 110 to prevent diminution of light. The light guide 140 distributes the light from the light source 110 onto the entire surface of each panel unit 400 and 600.

The porous reflector 120 is disposed under the light guide plate 140. In the present embodiment, the porous reflector uses a film including holes to reflect some of the light and to transmit some light.

A plurality of optical sheets 130 are disposed on the light guide plate 140 and the optical sheets 130 have a reflective-polarization film, a prism sheet, a diffusion sheet, and a diffuser, in the order shown in FIG. 1 from the top. The optical sheets 130 diffuse the light from the light source 110 toward the entire surface of each of the two panel units 400 and 600, and increase the amount of light as well. Additionally, the optical sheets 130 transmit the light in a variety of directions to increase a viewing angle.

The first panel unit 400 and first upper and lower polarizers 500 and 200 are disposed on the optical sheets 130, and the second panel unit 600 and second upper and lower polarizers 610 and 620 are disposed under the optical sheets 130. The optical sheets 130 may be disposed between the porous reflector 120 and the second upper polarizer 610.

Of the two panel units, one is a main panel unit and the other is a subsidiary panel unit. The main panel unit is larger than the subsidiary panel unit.

In FIG. 1, the first panel unit 400 is the main panel unit and the second panel unit 600 is the subsidiary panel unit. The subsidiary panel unit displays a portion of the contents displayed in the main panel unit, and thus the image quality of the subsidiary panel unit is less important than that of the main panel unit. Separate optical sheets are not provided on the second panel unit 600 to reduce a manufacturing cost, as shown in FIG. 1.

The first panel unit 400 preferably displays images primarily using the light from the source light 110, and the second panel unit 600 preferably displays images primarily using external light.

The porous reflector 120 that reflects some of the light and transmits some is now described.

The porous reflector 120 has a plurality of holes disposed on a reflector.

A ratio of amounts of incident light on the main panel unit and the subsidiary panel unit ranges from 7:3 to 6:4. A ratio of area of a reflective region and a hole region thereon also preferably ranges from 7:3 to 6:4. As a result, the amount of light entering the main panel unit is greater than the amount of light entering the subsidiary panel unit. Additionally, when images are displayed using the light from the light source, the luminance of the main panel unit is larger than that of the subsidiary panel unit.

The holes of the porous reflector 120 may be formed by patterning a photoresist. However, this method has a disadvantage in that a separate process for forming and etching a photoresist is required which increases manufacturing cost.

To reduce the manufacturing cost, the density of the reflective material on the porous reflector 120 is made so low that some incident light may be transmitted.

The reflective material may be a material with a good reflective characteristic, such as silver (Ag) or aluminum (Al). Ag is more preferable than Al, which may corrode. A ratio of transmittance to reflectance of the reflective material preferably ranges from 7:3 to 6:4.

A thin transflective film may be used instead of the porous reflector 120. The transflective film has both transmissive and reflective characteristics and has a thickness in the order of □, where □ is a half-wavelength of the light to be reflected or transmitted. A ratio of transmittance to reflectance of the transflective film may also range from 7:3 to 6:4.

As described above, both the porous reflector 120 and the thin transflective film, which are together referred to as a 'transflective sheet' hereinafter, reflect some light and transmit some light to provide light to the two panel unit units.

Figure 3:
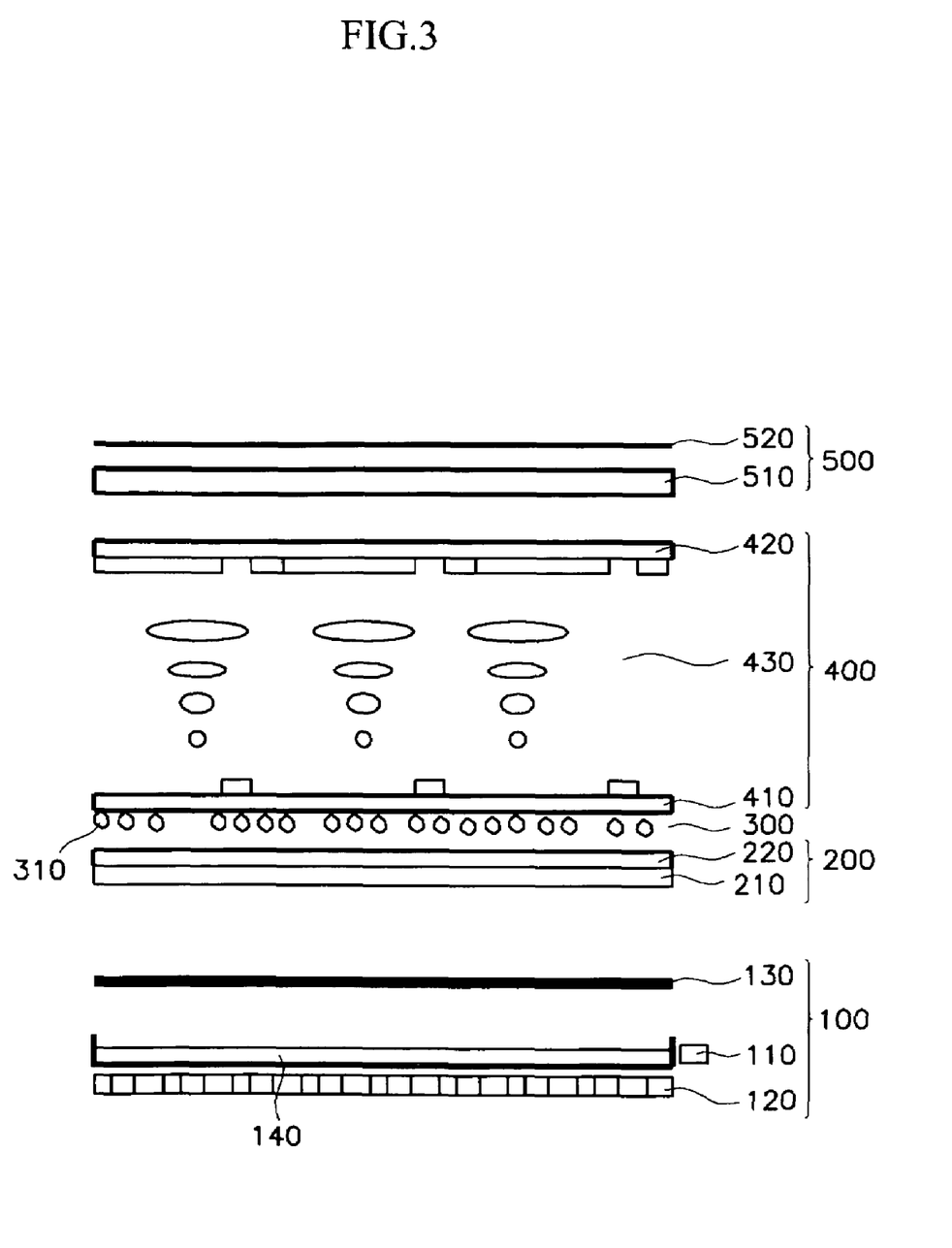
FIG. 3 is a sectional view of an LCD according to an exemplary embodiment of the present invention.
Figure 4:
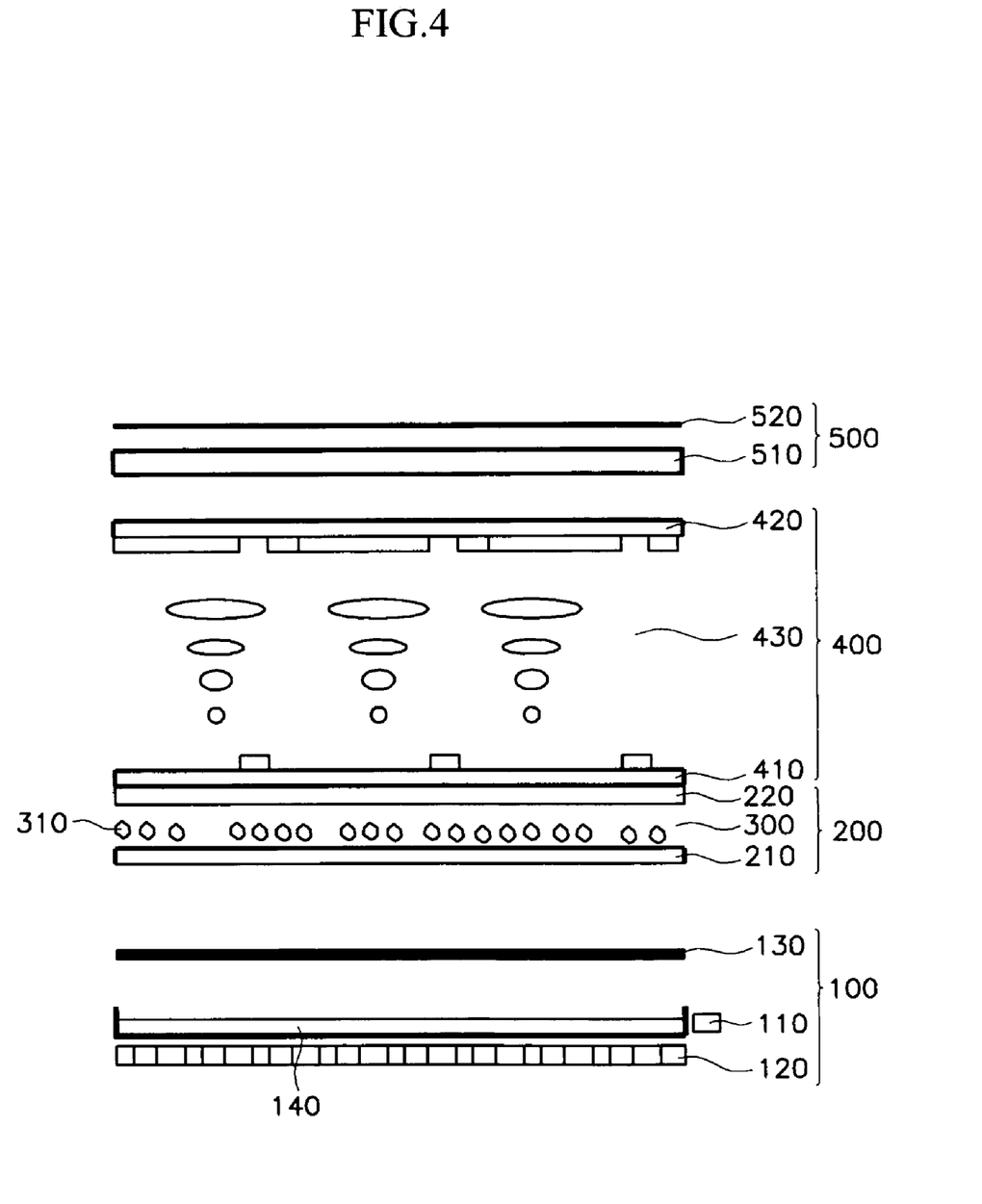
FIG. 4 is a sectional view of an LCD according to another embodiment of the present invention.
Figure 5:
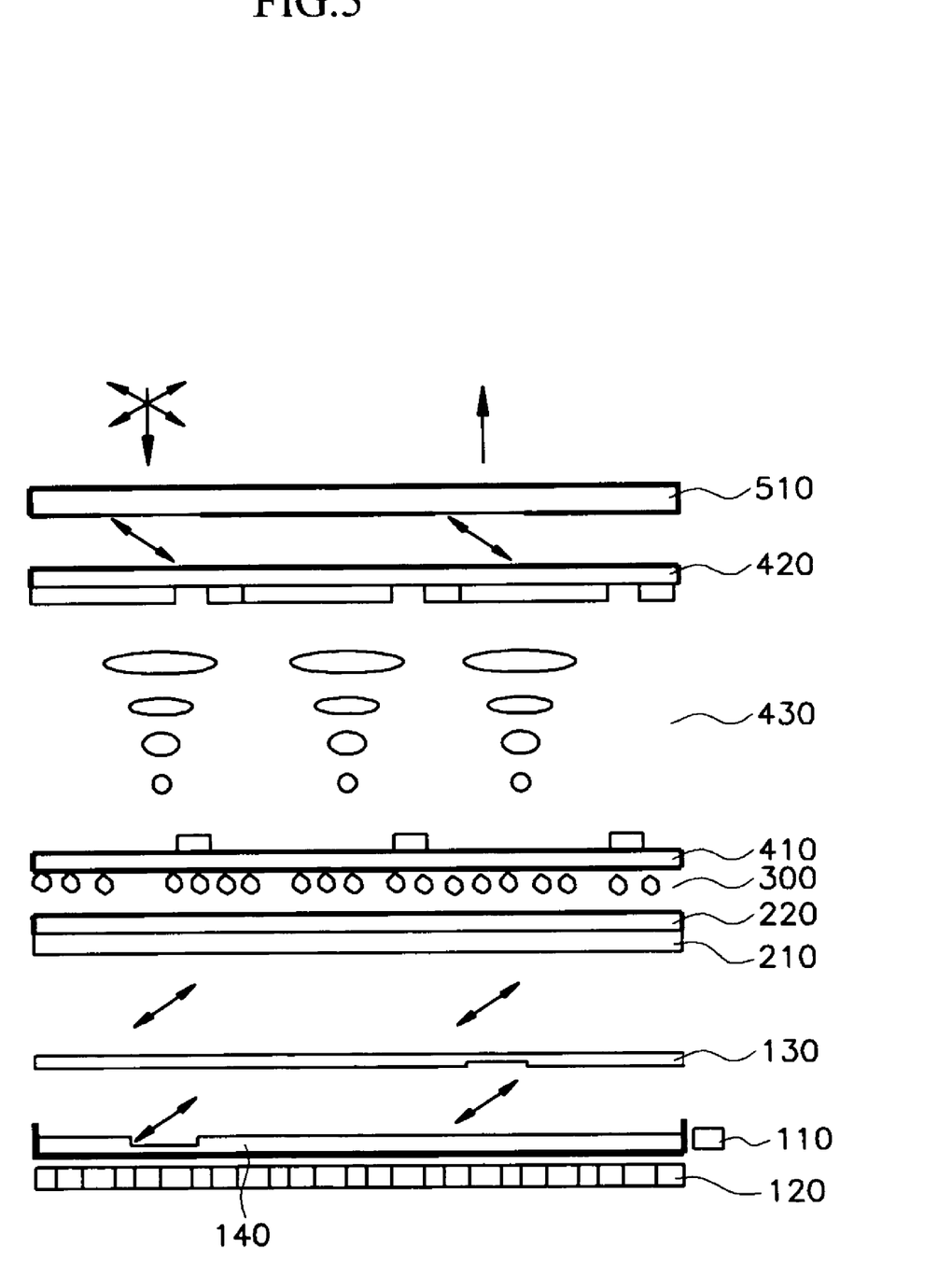
FIGS. 5 and 6 show an operation principle in a reflective mode of the LCD shown in FIG. 3.
Figure 6:
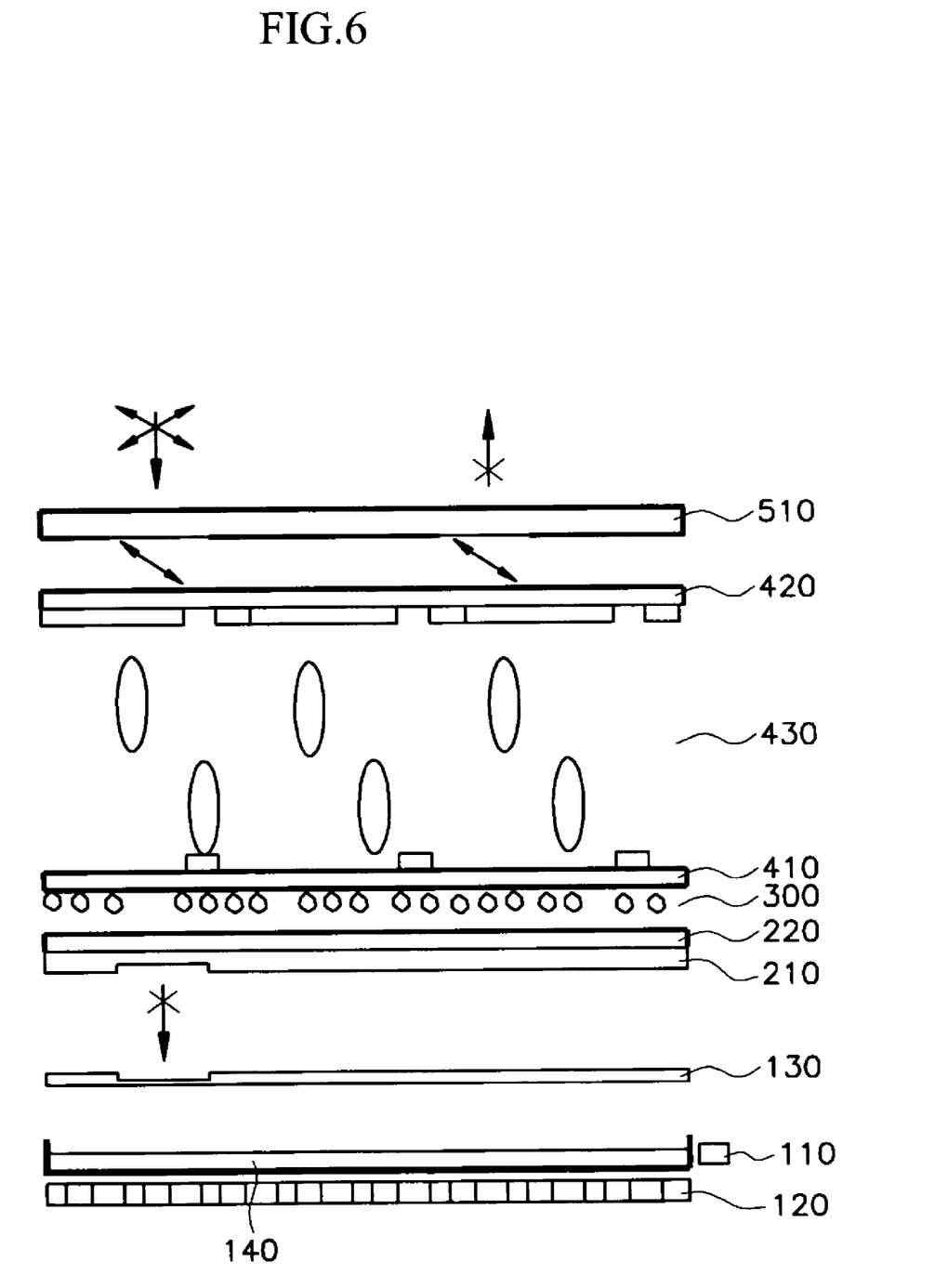
Figure 7:
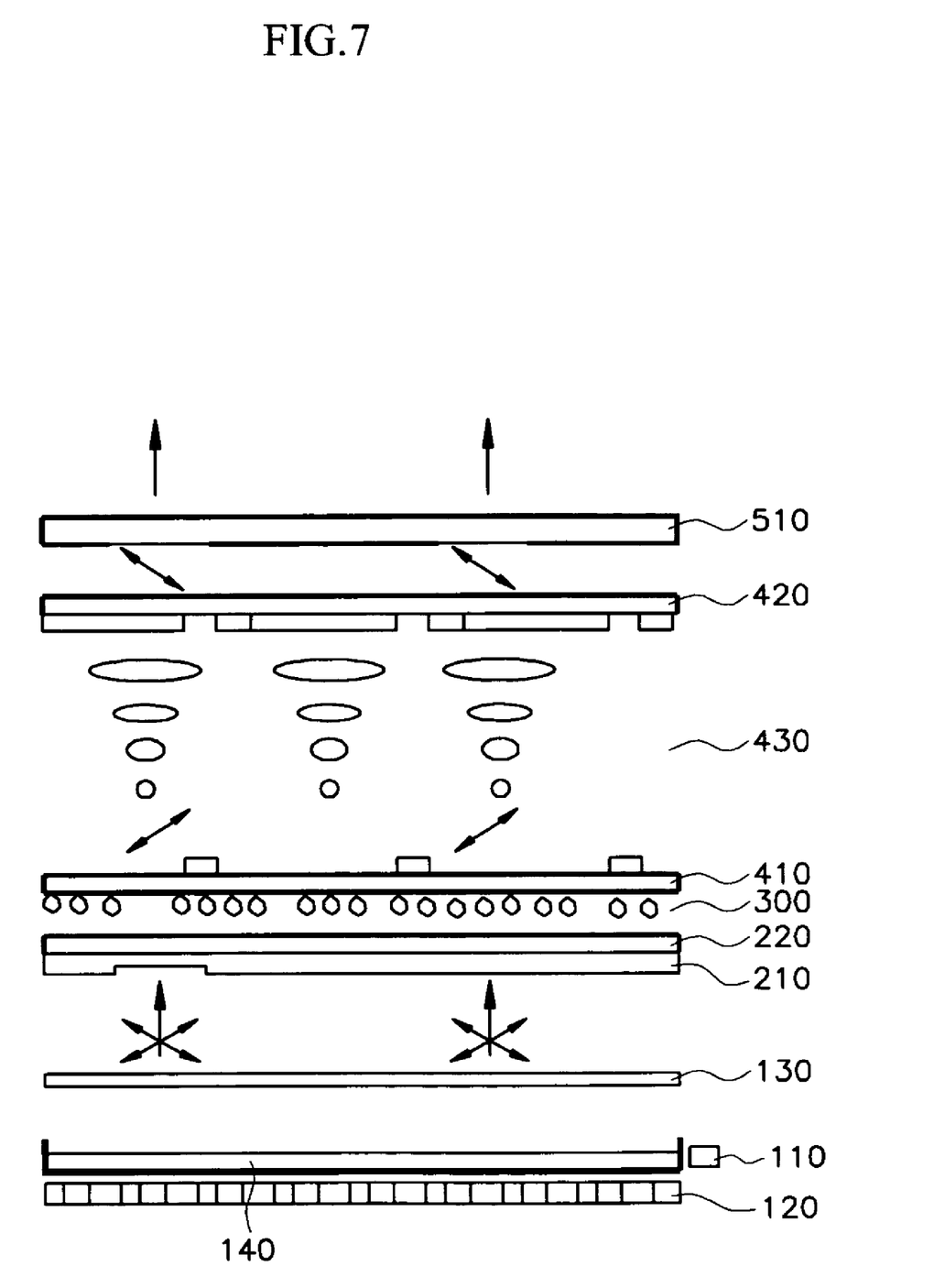
FIGS. 7 and 8 show an operation principle in a transmissive mode of the LCD shown in FIG. 3.
Figure 8:
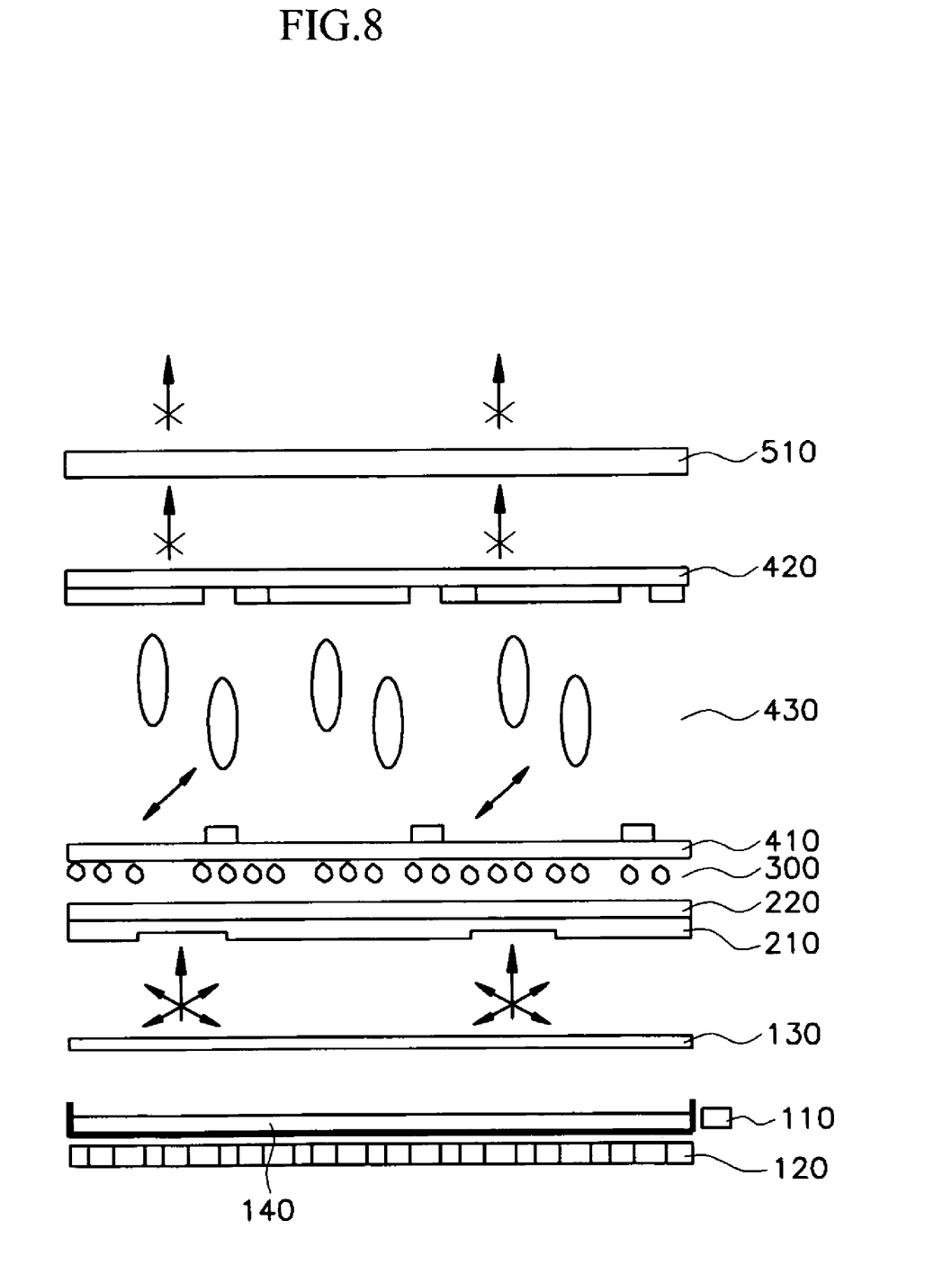

FIG. 3 is a sectional view of an LCD according to an exemplary embodiment of the present invention, FIG. 4 is a sectional view of an LCD according to an another embodiment of the present invention, FIGS. 5 and 6 show an operation principle in a reflective mode of the LCD shown in FIG. 3, and FIGS. 7 and 8 show an operation principle in a transmissive mode of the LCD shown in FIG. 3.

Referring to FIG. 3, an LCD according to an exemplary embodiment of the present invention includes a backlight unit 100, a first lower polarizer 200, a diffusion member 300, a panel unit 400, and a first upper polarizer 500.

The backlight unit 100 includes a light source 110, a porous reflector 120, which is a transflective sheet, and an optical sheet 130, which diffuses and scatters light. The backlight unit 100 is disposed at the back side of the first lower polarizer 200 to provide light toward the panel unit 400. In this case, the light from the backlight unit 100 may be light generated from the light source 110, external light reflected from the porous reflector 120, or a combination of the two kinds of light.

The porous reflector 120 may have an uneven surface structure or a diffusing pattern such that the external light is efficiently reflected.

The first lower polarizer 200 includes a lower polarizing film 210 and an upper polarizing film 220. The lower polarizing film 210 reflects some of the light from the backlight unit 100 and transmits some light, and the upper polarizing film 220 polarizes the light from the lower polarizing film 210 for output. The lower polarizing film 210 and the upper polarizing film 220 may be made as one film to reduce manufacturing time and to reduce a polarized component absorbed by the upper polarizing film 220.

The diffusion member 300 is disposed on the first lower polarizer 200 to diffuse the light from the first lower polarizer 200 for output, and is made of an adhesive including a scattering material. The scattering material may be made of silica particles, and diffuses light to facilitate a wide viewing angle and good visibility. The diffusion member 300 may adhere the first lower polarizer 200 to the panel unit 400, and may have a haze value of preferably more than 50%.

The panel unit 400 includes lower and upper panels 410 and 420 facing each other and a liquid crystal layer 430 interposed therebetween. The panel unit 400 transmits the light from the diffusion member 300, depending on an alignment of the liquid crystal layer 430.

The lower panel 410 includes a first substrate, a plurality of thin film transistors formed thereon, and a plurality of transparent electrodes. The transparent electrodes are preferably made of a conductive layer material such as indium tin oxide (ITO) or indium zinc oxide (IZO).

The upper panel 420 includes, sequentially, a second substrate, a plurality of color filters and light blocking layers, and a common electrode formed thereon. The color filters represent three primary colors, such as red, green, and blue, the light blocking layers prevents light from the transparent electrode from leaking, and the common electrode is preferably made of ITO or IZO.

The alignment of the liquid crystal layer 430 may be a twisted nematic (TN) type of 90 degrees. Alternatively, it may be a vertical alignment (VA) type.

The common electrode is formed on the lower panel instead of the upper panel, and in this case, an electric field generated by the common electrode and the transparent electrode is almost parallel to the substrate. This arrangement is called an in-plane switching (IPS) type.

The first upper polarizer 500 is disposed on the panel unit 400 and includes a polarizing film 510 that polarizes light from the upper panel unit 400. A low reflective layer 520 for reducing a reflectance of a surface is formed on the surface of the polarizing film 510. The low reflective layer 520 is made of a material having a low refractive index, or may include two or more layers having different refractive indices. For example, when a material having a refractive index of 1.5 is varied to that having a refractive index of 1.2, reflectance is reduced to 0.83% from 4%.

As described above, when the reflectance on the surface of the polarizing film 510 is reduced, an amount of incident light on the panel unit 400 is increased, thereby increasing reflectance of the panel unit 400. The low reflective layer 520 and the polarizing film 510 may be made as a single body.

The upper polarizing film 220 of the first lower polarizer 200 and the polarizing film 510 of the upper polarizer 500 absorb some polarized components and transmit others to regulate a transmissive direction of light. Polarizing axes of two polarizing films 220 and 510 are perpendicular to each other.

A transflective LCD according to another exemplary embodiment of the present invention is now described, referring to FIG. 4.

Referring to FIG. 4, an LCD according to an embodiment of the present invention includes a structure substantially identical to that shown in FIG. 3. That is, the LCD includes a backlight unit 100, a diffusion member 300, a first lower polarizer 200, a panel unit 400, and a first upper polarizer 500.

The backlight unit 100 includes a light source 110, a porous reflector 120, and an optical sheet 130, and the panel unit 400 includes lower and upper panels and a liquid crystal layer 430. The lower panel 410 includes a first substrate and a plurality of thin film transistors and transparent electrodes disposed thereon. The upper panel 420 includes a second substrate and a plurality of color filters, light blocking members, and a common electrode sequentially disposed thereon. The first upper polarizer 500 includes a polarizing film provided with a low reflective layer 520.

The first lower polarizer 200 includes a lower polarizing film 210 and an upper polarizing film 220.

However, unlike that shown in FIG. 3, a diffusion member 300 is interposed and adhered between the lower polarizing film 210 and the upper polarizing film 220 of the first lower polarizer 200. As mentioned above, making the first lower polarizer 200 and the diffusion member 300 as a single body reduces manufacturing time, and reduces polarized components absorbed in the upper polarizing film 220.

The lower polarizing film 210 of the first lower polarizer 200 shown in FIGS. 3 and 4 have characteristics as described below.

The lower polarizing film 210 is an optional reflective film and is made by laminating alternately two types of transparent films having different refractive indices. Thus, the lower polarizing film 210 reflects some incident light and transmits some incident light.

The direction along the a thickness of the polarizing film 210 is referred to as 'a z direction' and a surface on the polarizing film 210 is referred to as 'an x-y surface.' In this embodiment, a first layer has refractive anisotropic characteristics within the x-y surface and a second layer does not have refractive anisotropic characteristics. Thus, the film 210 has an anisotropic characteristic in which a transmittance and a refractive index are different depending on the polarized state and the direction of the incident light.

When refractive indices in the x and z directions are equal and the refractive indices at in the y direction are different for the first and the second layers, all polarized components in the x direction are transmitted and all polarized components in the y direction are reflected, as predicted by Fresnel's equation for unpolarized light entering in a direction perpendicular to the film 210 (i.e., the z direction). A DBEF (dual brightness enhancement film) manufactured by 3M Corporation is an example of a birefringent multi-layer film having these characteristics.

The DBEF has hundreds of alternately laminated layers of two different materials. For example, a DBEF may be formed by alternating a polyethylene naphthalate laminated layer having very high birefringence and a polymethyl methacrylate (PMMA) laminated layer having an isotropic structure. A naphthalene group has a plane structure and laminates well when it is adjacent to other layers. The refractive index of such a naphthalene group in the laminated direction is very different from that in the other directions. On the contrary, the PMMA is an amorphous polymer and has an isotropic alignment, and thus refractive indices in all the directions are identical.

As mentioned above, the DBEF manufactured by 3M Corporation transmits all of the polarized components in the x direction and reflects all of the polarized components in the y direction.

FIGS. 5 and 6 show an operation principle in a reflective mode of the LCD shown in FIG. 3, and FIGS. 7 and 8 show an operation principle in a transmissive mode of the LCD shown in FIG. 3.

Referring to FIG. 5, when no electric field is applied to the liquid crystal layer 430, external light passing through the third polarizing film 510 is linearly polarized along a polarizing axis of the third polarizing film 510. The linearly polarized light passes through the upper panel 420, the liquid crystal layer 430, and the lower panel 410 to become a linearly polarized light perpendicular to the polarizing axis of the third polarizing film 510 by the alignment of the liquid crystal. This light then enters the second polarizing film 220. The incident light passes through the first polarizing film 210 and is then reflected by the porous reflector 120.

The reflected light passes through the first polarizing film 210, then is diffused by the diffusion member 300 and is linearly polarized by the second polarizing film 220 for output. The linearly polarized light passes through the lower panel 410, the liquid crystal layer 430, and the upper panel 420, and is linearly polarized along the polarizing axis of the third polarizing film 510 by the alignment of the liquid crystal, and it then passes through the third film 510, thereby displaying a white image.

Referring to FIG. 6, when a sufficiently strong electric field is applied to the liquid crystal layer 430 and then the liquid crystal is aligned perpendicular to the panels 410 and 420, external light passing through the third film 510 is linearly polarized along the polarizing axis of the third film 510. The linearly polarized light then passes through the liquid crystal layer 430 towards the second the polarizing film 210. The incident light on the second film 210 does not pass through the second film 210 but is absorbed.

Accordingly, the external light does not reach the reflector 120 of the backlight unit 100, so there is no reflected light, and thereby a black image is displayed.

Figure 9:
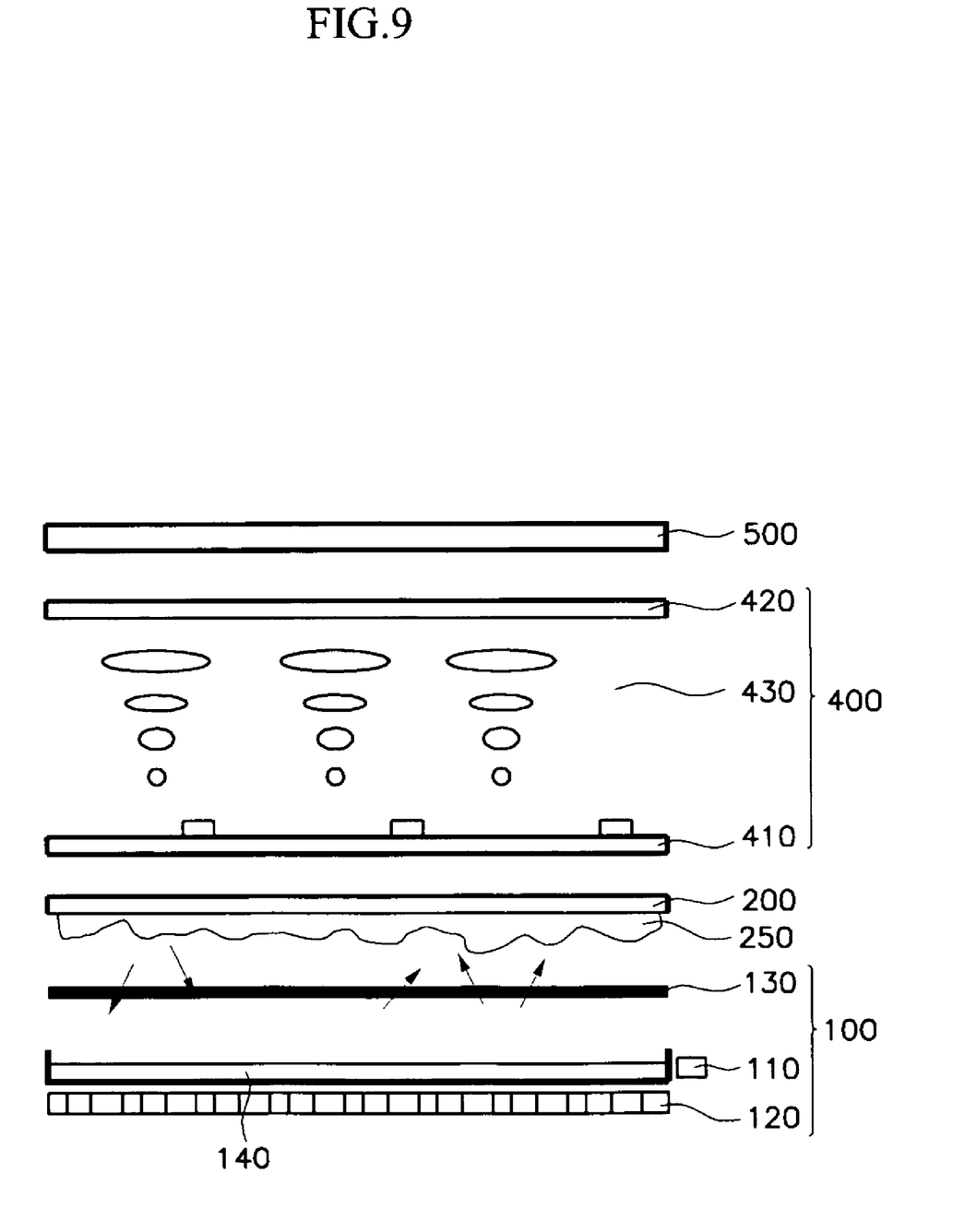
FIG. 9 is a sectional view of an LCD according to still another embodiment of the present invention.

FIGS. 7 and 9 show an operation principle for a transmissive mode of the transflective LCD shown in FIG. 3.

Referring to FIG. 7, when no electric field is applied to the liquid crystal layer 430, light from the backlight unit 100 passing through the first lower polarizer 210 is linearly polarized along the polarizing axis of the lower polarizer 210, then is diffused by the diffusion member 300 for output, and is linearly polarized along the polarizing axis of the first upper polarizer 220. The linearly polarized light passes through the lower panel 410, the liquid crystal layer 430, and the upper panel 420, and is linearly polarized perpendicular to the polarizing axis of the first upper polarizing film 220 to enter the third polarizing film 510. The film 510 transmits the light to display a white image.

Referring to FIG. 8, when a sufficiently strong electric field with enough magnitude is applied to the liquid crystal layer 430 and then the liquid crystal is aligned perpendicular to the panels 410 and 420, light from the backlight unit 100 passing through the first lower polarizer 210 is linearly polarized along the polarizing axis of the polarizer 210, is then diffused by the diffusion member 300 for output. The light is then linearly polarized along the polarizing axis of the first upper polarizer 220. The linearly polarized light passes through the lower panel 410, the liquid crystal layer 430, and the upper panel 420, but maintains the previous polarized state. The light passing through the liquid crystal layer 430 has a polarization perpendicular to the polarizing axis of the third film 510 and thus does not pass therethrough, but rather it is absorbed in the third film 510. A black image is therefore displayed.

FIG. 9 is a sectional view of an LCD according to still another embodiment of the present invention.

The backlight unit 100 includes a light source 110, a porous reflector 120 which is a transflective sheet, and an optical sheet 130 which diffuses and scatters light. The backlight unit 100 is disposed at the back side of the first lower polarizer 200 to provide light toward the panel unit 400. In this case, the light from the backlight unit 100 may be light generated from the light source 110, external light reflected on the porous reflector 120, or a combination of the two kinds of light.

The porous reflector 120 may have an uneven surface structure or a diffusing pattern, such that external light is efficiently reflected.

A low reflective film 250 is disposed under the first lower polarizer 200. Light incident on the low reflective film 250 is scattered such that a distribution of output light is regulated to develop a wide viewing angle and a good reflective index at the front of the reflective film 250. The low reflective layer 250 is formed on only the lower panel 200, and is not formed on the first upper panel 500. The light from the lower side passes through the low reflective layer 250 to be scattered, thereby substantially increasing visibility. However, adding a low reflective layer on the upper panel 500 has little contribution to an increase of the visibility, but rather reduces luminance.

The first lower panel 200 diffuses and polarizes the light from the backlight unit 100 for output to the panel unit 400.

The panel unit 400 includes lower and upper panels 410 and 420 facing each other, and a liquid crystal layer 430 interposed therebetween. The panel unit 400 transmits light depending on an alignment of the liquid crystal layer 430.

The lower panel 410 includes a first substrate, a plurality of thin film transistors formed thereon, and a plurality of transparent electrodes. The transparent electrodes are preferably made of a conductive layer material such as indium tin oxide (ITO) or indium zinc oxide (IZO).

The upper panel 420 includes a second substrate, a plurality of color filters and light blocking layers, and a common electrode sequentially formed thereon. The color filters represent three primary colors such as red, green, and blue. The light blocking layers prevents light from the transparent electrode from leaking, and the common electrode is preferably made of ITO or IZO.

The alignment of the liquid crystal layer 430 may be a twisted nematic (TN) type of 90 degrees. Alternatively, it may be a vertical alignment (VA) type.

The common electrode is formed on the lower panel instead of the upper panel, and in this case, an electric field generated by the common electrode and the transparent electrode is almost parallel to the substrate. Such an arrangement is called an in-plane switching (IPS) type.

The first upper polarizer 500 is disposed on the panel unit 400 and polarizes the light from the upper panel unit 400.

The first lower polarizer 200 and the upper polarizer 500 absorb some polarized components and transmit others to regulate a transmissive direction of light. Polarizing axes of the two polarizers 200 and 500 are perpendicular to each other.

Figure 10:
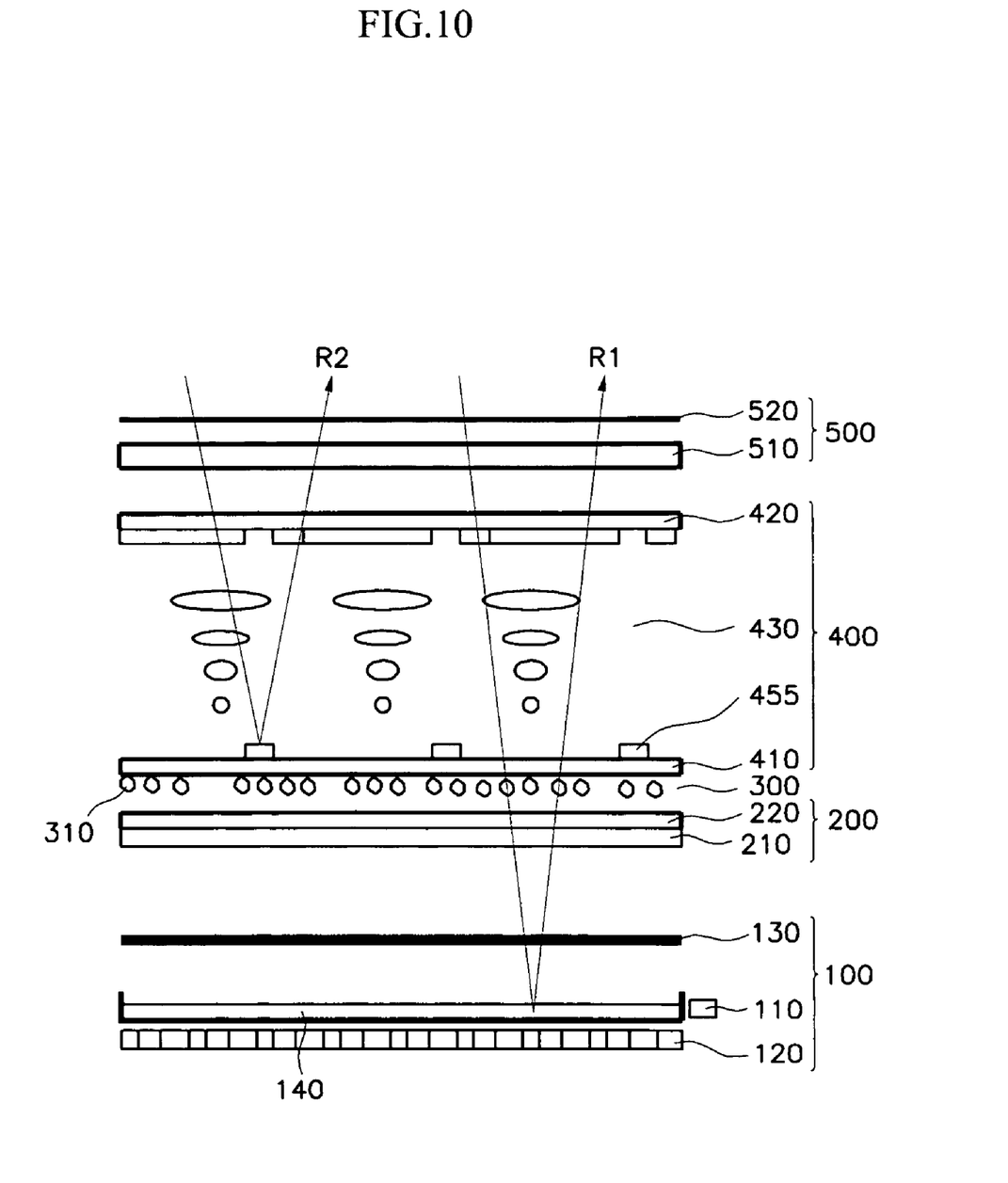
FIG. 10 is a sectional view of an LCD according to still another embodiment of the present invention.
Figure 11:
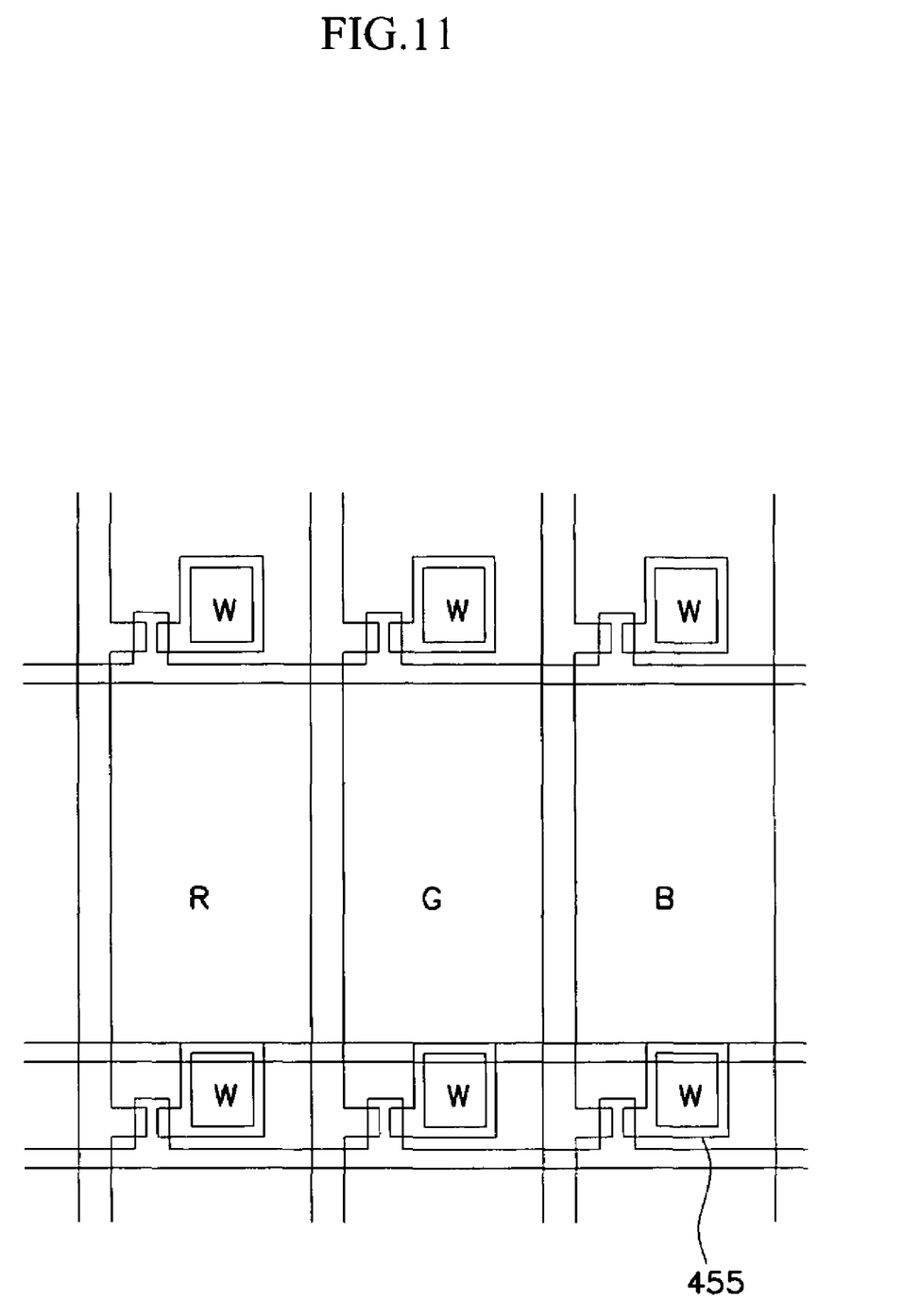
FIG. 11 is a layout view of the LCD shown in FIG. 10.

FIG. 10 is a sectional view of an LCD according to still another embodiment of the present invention, and FIG. 11 is a layout view of an LCD shown in FIG. 10.

The backlight unit 100 includes a light source 110, a porous reflector 120 which is a transflective sheet, and an optical sheet 130 that diffuses and scatters light. The backlight unit 100 is disposed at the back side of the first lower polarizer 200 to provide light toward the panel unit 400. In this case, the light from the backlight unit 100 may be light generated from the light source 110, external light reflected on the porous reflector 120, or a combination of the two kinds of light.

The first lower polarizer 200 includes a lower polarizing film 210 and an upper polarizing film 220. The lower polarizing film 210 reflects some of the light from the backlight unit 100 and transmits some of the light, and the upper polarizing film 220 polarizes the light from the lower polarizing film 210 for output. The lower polarizing film 210 and the upper polarizing film 220 may be made as one film to reduce manufacturing time and to reduce a polarized component absorbed in the upper polarizing film 220.

The diffusion member 300 is disposed on the first lower polarizer 200 to diffuse the light therefrom for output, and is made of an adhesive including a scattering material. The scattering material may be made of silica particles 310, and diffuses light to develop a wide viewing angle and good visibility. The diffusion member 300 may adhere the first lower polarizer 200 to the panel unit 400, and have a haze value tof preferably more than 50%.

The panel unit 400 includes lower and upper panels 410 and 420 facing each other and a liquid crystal layer 430 interposed therebetween. The panel unit 400 transmits light from the diffusion member 300, depending on an alignment of the liquid crystal layer 430.

The lower panel 410 includes a first substrate, a plurality of thin film transistors formed thereon, a plurality of storage electrodes 455, and a plurality of transparent electrodes. The transparent electrodes are preferably formed of a conductive layer material such as indium tin oxide (ITO) or indium zinc oxide (IZO). The storage electrodes 455 are formed to maintain voltages in the transparent electrodes, and are made of a reflective material for reflecting incident light thereon.

The upper panel 420 includes a second substrate, a plurality of color filters and light blocking layers, and a common electrode sequentially formed thereon. The color filters represent three primary colors such as red, green, and blue. The light blocking layers prevents light from the transparent electrode from leaking, and the common electrode is preferably made of ITO or IZO. The color filters disposed on the storage electrodes 455 are removed. The incident light on the storage electrodes 455 is reflected thereon to output it to the outside. At this time, most of the reflected light passes through a portion with no color filter present to add a white color to the previous image, thereby increasing luminance.

The alignment of the liquid crystal layer 430 may be a twisted nematic (TN) type of 90 degrees. Alternatively, it may be a vertical alignment (VA) type.

The common electrode is formed on the lower panel instead of the upper panel, and in this case, an electric field generated by the common electrode and the transparent electrode is almost parallel to the substrate. This arrangement is called an in-plane switching (IPS) type.

The first upper polarizer 500 is disposed on the panel unit 400 and includes a polarizing film 510 that polarizes light from the upper panel unit 400. A low reflective layer 520 for reducing reflectance of a surface is formed on the surface of the polarizing film 510. The low reflective layer 520 is made of a material having a low refractive index, or may include two or more layers having different refractive indices. For example, when a material having a refractive index of 1.5 is varied to that having a refractive index of 1.2, reflectance is reduced to 0.83% from 4%.

As described above, when the reflectance on the surface of the polarizing film 510 is reduced, an amount of incident light on the panel unit 400 is increased, thereby increasing its reflectance. The low reflective layer 520 and the polarizing film 510 may be made as a single body.

The upper polarizing film 220 of the first lower polarizer 200 and the polarizing film 510 of the upper polarizer 500 absorb some polarized components and transmit some polarized components to regulate a transmissive direction of light. Polarizing axes of the two polarizing films 220 and 510 are perpendicular to each other.

As shown in FIGS. 10 and 11, when the storage electrode is made of a reflective material and the color filter thereon is removed, it has the effect as if a white colored pixel is added to the existing structure. Additionally, the storage electrode hinders light from the backlight unit and thus light leakage does not occur in the transmissive mode. As a result, the luminance is increased as a whole.

Although the porous reflector has been described as an example of a transflective sheet of reflecting some light and transmitting some light, the present invention is not limited to using a porous reflector. For example, a transflective sheet such as a thin transflective film may be used.

As described above, when light from a light source enters toward the two panel units, the two panel units are used as a transmissive type and a reflective type device that uses a film for reflecting some light and transmitting some light. Additionally, luminance is increased by using external light as well as light from the light source.

While the present invention has been described in detail with reference to the preferred embodiments, it is to be understood that the invention is not limited to the disclosed embodiments. The present invention covers also various modifications and equivalent arrangements included within the scope of the appended claims.

What is claimed is:

1. A liquid crystal display comprising:
a backlight unit including a light source and a light guide plate;
a first panel unit disposed on a first side of the backlight unit;
a second panel unit disposed on a second side of the backlight unit;
a porous reflector disposed adjacent the light guide plate and formed separately from the light guide plate, the porous reflector reflecting light to illuminate the first panel unit and transmitting light to illuminate the second panel unit;
a first lower polarizer disposed between the first panel unit and the backlight unit and disposed under the first panel unit, wherein the first lower polarizer comprises a first polarizing film facing the backlight unit, and reflecting some of the light and transmitting some of the light; and a second polarizing film that polarizes the transmitted light;
a first upper polarizer disposed opposite to the first lower polarizer; and
a diffusion member disposed on one side of the first lower polarizer.

2. The liquid crystal display of claim 1, wherein the porous reflector has a low density of reflective material that it reflects some of the light and transmits some of the light.

3. The liquid crystal display of claim 1, wherein the porous reflector comprises a patterned reflective plate including areas devoid of reflective material to allow light transmission.

4. The liquid crystal display of claim 1, further comprising:
an optical sheet disposed between the first lower polarizer and the light guide plate of the backlight unit.

5. The liquid crystal display of claim 1, wherein the first polarizing film and the second polarizing film are made as one film.

6. The liquid crystal display of claim 1, wherein the diffusion member comprises an adhesive including a scattering material.

7. The liquid crystal display of claim 1, wherein a ratio of transmittance to reflectance of the porous reflector ranges from 7:3 to 6:4.

8. A liquid crystal display, comprising:
a backlight unit including a light source and a light guide plate;
a first panel unit disposed on a first side of the backlight unit;
a second panel unit disposed on a second side of the backlight unit;
a porous reflector disposed adjacent the light guide plate and formed separately from the light guide plate, the porous reflector reflecting light to illuminate the first panel unit and transmitting light to illuminate the second panel unit;
a first lower polarizer disposed between the first panel unit and the backlight unit and disposed under the first panel unit;
a first upper polarizer disposed opposite to the first lower polarizer, comprising a polarizing film having a surface that is processed with a low reflective material; and
a diffusion member disposed on one side of the first lower polarizer.

9. A liquid crystal display, comprising:
a backlight unit including a light source and a light guide plate;
a first panel unit disposed on a first side of the backlight unit;
a second panel unit disposed on a second side of the backlight unit;
a porous reflector disposed adjacent the light guide plate and formed separately from the light guide plate, the porous reflector reflecting light to illuminate the first panel unit and transmitting light to illuminate the second panel unit;
a first lower polarizer disposed between the first panel unit and the backlight unit and disposed under the first panel unit; and
a first upper polarizer disposed opposite to the first lower polarizer wherein the first lower polarizer comprises a diffusion member includes an adhesive containing a scattering material.

10. A liquid crystal display, comprising:
a backlight unit including a light source and a light guide plate;
a first panel unit disposed on a first side of the backlight unit;
a second panel unit disposed on a second side of the backlight unit;
a porous reflector disposed adjacent the light guide plate and formed separately from the light guide plate, the porous reflector reflecting light to illuminate the first panel unit and transmitting light to illuminate the second panel unit;
a first lower polarizer disposed between the first panel unit and the backlight unit and disposed under the first panel unit; and
a first upper polarizer disposed opposite to the first lower polarizer wherein a low reflective layer is formed on a surface of the first lower polarizer facing the backlight unit.

11. A liquid crystal display, comprising:
a backlight unit including a light source and a light guide plate;
a first panel unit disposed on a first side of the backlight unit;
a second panel unit disposed on a second side of the backlight unit;
a porous reflector disposed adjacent the light guide plate and formed separately from the light guide plate, the porous reflector reflecting light to illuminate the first panel unit and transmitting light to illuminate the second panel unit;
thin film transistors, and transparent electrodes connected to the thin film transistors;
a first panel comprising storage electrodes for maintaining charged voltages in the transparent electrodes for a certain time; and
a second panel facing the first panel and comprising black matrices, color filters between the black matrices, and a common electrode,
wherein the storage electrodes are made of a reflective material and no color filters are provided over the storage electrodes.

12. A liquid crystal display comprising:
a backlight unit having a light source and a light guide plate;
a first panel unit disposed on a first side of the backlight unit;
a second panel unit disposed on a second side of the backlight unit;
a transflective sheet disposed adjacent the light guide plate and formed separately from the light guide plate, the transflective sheet reflecting light to illuminate the first panel unit transmitting light to illuminate the second panel unit;
a first lower polarizer disposed between the first panel unit and the backlight unit and disposed under the first panel unit, wherein the first lower polarizer comprises a first polarizing film facing the backlight unit, and reflecting some of the light and transmitting some of the light; and a second polarizing film that polarizes the transmitted light;
a first upper polarizer disposed opposite to the first lower polarizer; and
a diffusion member disposed on one side of the first lower polarizer.

13. The liquid crystal display of claim 12, wherein the transflective sheet has a thickness of approximately $\lambda/2$, where $\lambda/2$ is a half-wavelength of the light to be reflected or transmitted.

14. The liquid crystal display of claim 13, wherein a ratio of transmittance to reflectance of the transflective sheet ranges from 7:3 to 6:4.

15. A liquid crystal display comprising:
a backlight unit including a light source and a light guide plate;
a first panel unit comprising an upper panel, a lower panel facing the upper panel, a first upper polarizer disposed on the upper panel, a first lower polarizer disposed under the lower panel, a diffusion member disposed on one side of the first lower polarizer, and a liquid crystal layer interposed between the first and second panels, retarding light passing therethrough by $\lambda/2$, having a twisted nematic mode, and forming an angle of 90 degrees between liquid crystal adjacent to the upper panel and liquid crystal adjacent to the lower panel, wherein the first lower polarizer comprises a first polarizing film facing the backlight unit, and reflecting some of the light and transmitting some of the light, and a second polarizing film polarizing the transmitted light;
a second panel unit disposed under the first panel unit; and
a porous reflector disposed adjacent the light guide plate and formed separately from the light guide plate, the porous reflector reflecting light to illuminate the first panel unit and transmitting light to illuminate the second panel unit.

16. The liquid crystal display of claim 15, wherein the second panel unit comprises an upper panel, a lower panel facing the upper panel, and a liquid crystal layer interposed between the first and second panels, retarding light passing therethrough by $\lambda/2$, having a twisted nematic mode, and forming an angle of 90 degrees between liquid crystal adjacent to the upper panel and liquid crystal adjacent to the lower panel.

17. The liquid crystal display of claim 15, wherein the porous reflector has a low density reflective material which reflects and transmits light.

18. The liquid crystal display of claim 15, wherein the porous reflector comprises a patterned reflective plate.

19. The liquid crystal display of claim 15, wherein the diffusion member comprises an adhesive containing a scattering material.

20. A liquid crystal display comprising:
a backlight unit including a light source and a light guide plate;
a first panel unit disposed on a first side of the backlight unit;
a second panel unit disposed on a second side of the backlight unit;
a porous reflector adjacent the light guide plate and formed separately from the light guide plate, the porous reflector having a plurality of holes so that it reflects light to illuminate the first panel unit and transmits light through the holes to illuminate the second panel unit;
a first lower polarizer disposed between the first panel unit and the backlight unit and disposed under the first panel unit, wherein the first lower polarizer comprises a first polarizing film facing the backlight unit, and reflecting some of the light and transmitting some of the light; and a second polarizing film that polarizes the transmitted light;
a first upper polarizer disposed opposite to the first lower polarizer; and
a diffusion member disposed on one side of the first lower polarizer.

21. The liquid crystal display of claim 20, wherein the holes of the porous reflector are formed by patterning a photoresist provided on a reflective plate.

22. The liquid crystal display of claim 20, wherein a ratio of transmittance to reflectance of the porous reflector ranges from 7:3 to 6:4.

23. The liquid crystal display of claim 22, wherein a ratio of area of a reflective region and a hole region ranges from 7:3 to 6:4.

* * * * *